May 12, 1925.                                                                1,537,923
C. H. NORTON
HEADSTOCK DRIVING MECHANISM
Filed Nov. 21, 1922
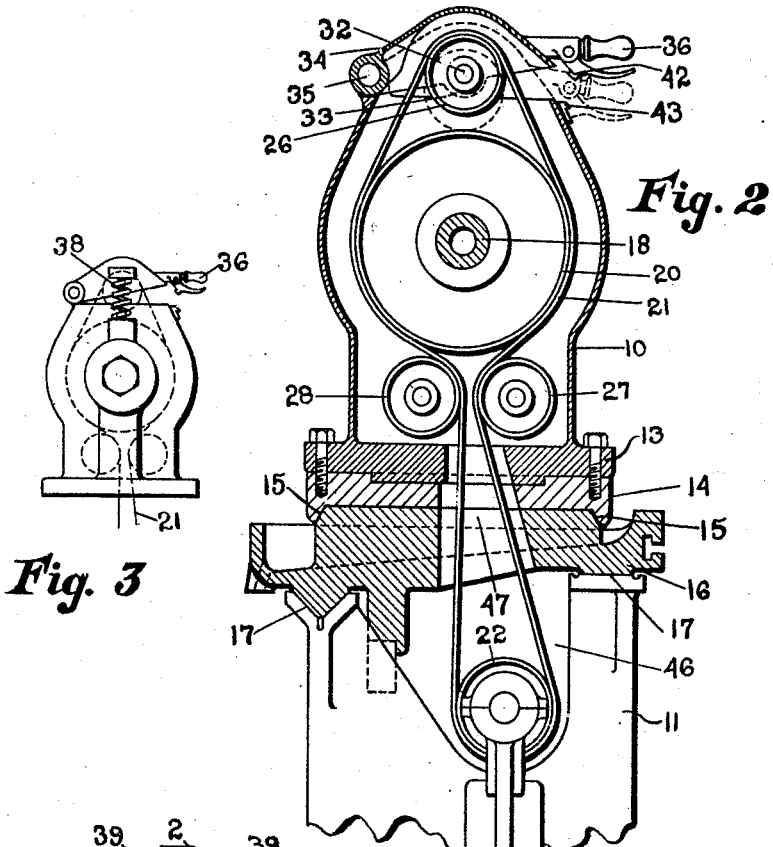
Fig. 2
Fig. 3
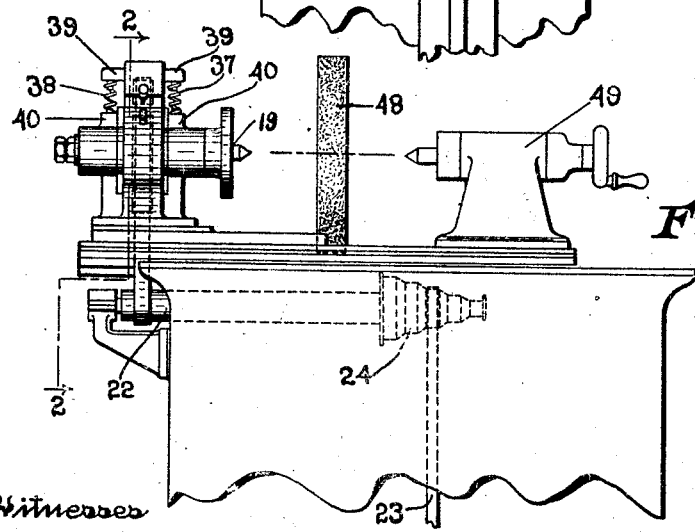
Fig. 1
Witnesses
Harold W. Eaton
Anna Murphy
Inventor
Charles H. Norton
By Clayton R. Jenks
Attorney

Patented May 12, 1925.

1,537,923

UNITED STATES PATENT OFFICE.

CHARLES H. NORTON, OF PLAINVILLE, CONNECTICUT, ASSIGNOR TO NORTON COMPANY, OF WORCESTER, MASSACHUSETTS, A CORPORATION OF MASSACHUSETTS.

HEADSTOCK-DRIVING MECHANISM.

Application filed November 21, 1922. Serial No. 602,452.

*To all whom it may concern:*

Be it known that I, CHARLES H. NORTON, a citizen of the United States of America, residing at Plainville, State of Connecticut, have invented certain new and useful Improvements in a Headstock-Driving Mechanism, of which the following is a full, clear, and exact specification.

My invention relates to a head stock driving mechanism and particularly to a grinding machine construction adapted for rotating the work to be ground.

The main object of my invention is to provide a simple and economically constructed mechanism, which will drive the work steadily and prevent the formation of chatter marks in the work and which is particularly adapted for use with a reciprocating work carrying table or a head stock which is longitudinally adjustable on the machine to hold different lengths of work. Further objects will be apparent in the following disclosure:

In the drawings, in which like reference numerals indicate like parts:

Fig. 1 is a front elevation of a grinding machine with parts removed and broken away, showing the application of my head stock drive to a grinding machine;

Fig. 2 is an enlarged section on the line 2—2 of Fig. 1; and

Fig. 3 is an end view of the head stock.

In accordance with my invention I propose to drive the head stock spindle by means of a belt which is held in frictional engagement with the spindle pulley by an adjustably positioned idler pulley. This belt is driven preferably from a drum, so positioned in the base of the machine that the headstock may be adjusted or reciprocated longitudinally of the machine as may be desired.

Referring more particularly to the drawings, I have there shown the head stock housing 10 mounted on the base 11 for reciprocatory movement. If it is desired to turn the head stock about a vertical axis, I provide the base 13 of the housing with a depending circular boss which fits into a suitably shaped socket in the slide 14. To permit locking the head stock at a desired angle, cap screws passing through arcuate slots in base 13 are threaded into the slide 14. The slide 14 is adjustably positioned on ways 15 of the table 16, which in turn is mounted on ways 17 of the machine base. These parts may be made in accordance with any well known or desired construction. The head stock driving spindle is suitably mounted in bearings in the housing 10 and a driving plate and center 19 or other construction may be provided for locating and supporting one end of the work. A pulley 20 is mounted on the spindle 18 to rotate therewith.

In the base of the machine I have provided a driver adapted to be connected by a belt 21 with the pulley 20. As illustrated, this driver may comprise a drum 22 supported on suitably mounted bearings in the base of the machine. This drum may be driven by a belt 23, which connects a power shaft with the variable speed cone pulley 24, mounted on the drum. In order to start and stop the pulley 20 and the head stock, I provide means for holding the belt 21 in driving relation to the pulley 20 or releasing it therefrom, which comprise an idler pulley 26 adjustably mounted in the top of the head stock. The belt passes over this idler pulley and is held in engagement with a large portion of the driving surface of the pulley 20 by means of small idlers 27 and 28, mounted below the main pulley 20. By placing these idler pulleys 27 and 28 close together, I provide a large amount of driving contact between the belt and the pulley 20 and at the same time hold the upward and downward runs of the belt close together, to permit the head stock to turn about a vertical axis.

In order to tension the belt I mount the pulley 26 on spindle 32, the bearings of which are adapted to be moved outwardly. As shown, the bearings may be mounted in a movable member 34, which may serve as the cover for the housing. This cover 34 is pivoted at 35 on the housing and has a handle 36 rigidly attached thereto for positioning the casing cover and idler pulley 26. This member 34 is maintained in an elevated position to tension the belt by means of springs 37 and 38, located on opposite sides of the housing and bearing at their upper and lower ends against projections 39 of the cover and shoulders 40 on the housing. In order to stop the rotation of the pulley 20, I provide the handle 36 with a latch 42 adapted to engage a catch 43 on the housing and thus hold the cover 39 down against the action of the compressed springs. When the latch is thus locked in position, the upper idler pulley 26 is positioned just above the surface of the pulley 20. By pressing the handle down below its normal locked inoperative position the oppositely traveling surfaces of the pulleys may be brought into frictional engagement and the pulley 20 quickly brought to a stop.

In order to provide for moving the head stock longitudinally of the machine, or for reciprocating the table 16, I cut away the central portion of the base 11 as shown at 46 and similarly provide a longitudinal slot 47 through the table 16 and the head stock base and slide members 13 and 14. The cut-out portion 46 of the base is as long as the drum so that the head stock may be reciprocated or positioned as desired, relative to the grinding wheel 48 and tail stock 49, which are illustrated in Fig. 1 of the drawings. The slot 47 is made sufficiently long to permit adequate adjustment of the head stock relative to the table 16.

The operation of this mechanism will be obvious from the above disclosure. When it is desired to stop the rotation of the head stock, the handle 36 is depressed. The belt tension is relieved, and the belt dropped from driving contact with the drum in the base of the machine. At the same time the pulley 20 is braked and caused to stop its rotation. To start the head stock drive, it is merely necessary to release the latch 42 and permit the adjustable idler pulley 26 to move vertically upward under the pressure of the springs 37 and 38. It will, therefore, be seen that I have provided a simple self contained construction which permits one to drive the head stock from a source of power within the base and at variable speeds and in different positions without necessitating the use of elaborate gear mechanisms and telescoping driving members.

Having thus described my invention, what I claim as new and desire to secure by Letters Patent is:

1. A head stock spindle driving mechanism, comprising a pulley on the spindle, a driver connected with a source of power, an adjustably positioned idler pulley, a single belt passing over said driver and pulleys, means for automatically moving the idler pulley to tension the belt and cause a driving action, and manually controlled means for moving the idler pulley to release the driving friction of the belt and stop the spindle.

2. A head stock driving mechanism comprising a head stock spindle, a pulley mounted thereon, a driving member mounted in the base of the machine, an adjustably positioned idler pulley located above the spindle driving pulley, a belt passing from the idler pulley to the driver and in frictional engagement with the sides of the spindle pulley, means for automatically lifting the idler pulley to tension the belt and manually controlled means for releasing said tension and stopping the spindle.

3. A head stock driving mechanism for a reciprocable head stock slide, a spindle mounted thereon, a pulley on the spindle, a drum mounted in the base of the machine axially parallel to the spindle, an idler pulley adjustably mounted above the spindle pulley, a belt connecting said idler and drum and passing in frictional contact with opposite portions of the spindle pulley, and manually releasable means for automatically moving the idler pulley and tensioning the belt.

4. In a grinding machine having a longitudinally movable head stock, a spindle, a driving pulley thereon, a power driven drum mounted in the machine base axially parallel with said pulley, an adjustably positioned idler pulley, a single belt passing from the drum to the idler pulley and in contact with the sides of the spindle pulley, idlers to hold the two runs of the belt close together beneath the spindle pulley, automatic means for adjustably positioning the idler pulley to tension the belt and cause frictional driving engagement with the spindle pulley and manually controlled means for releasing said tension and dropping the belt from driving contact with the drum.

5. In a grinding machine having a longitudinally movable head stock, a spindle, a driving pulley thereon, a driver connected with a source of power, an adjustably positioned idler pulley, a single belt passing from the driver to the idler pulley and in contact with the sides of the spindle pulley, idlers to hold the two runs of the belt close together beneath the spindle pulley, means for swivelling said head stock on its support, automatic means for adjustably positioning the idler pulley to tension the belt and cause frictional driving engagement with the spindle pulley and manually controlled means for releasing said tension and dropping the belt from driving contact with the drum.

6. A grinding machine comprising a head stock spindle, a pulley thereon, an idler pulley adjustably mounted above the spindle pulley, a driver in the machine base connected with a source of power, a single belt running from the driver to the idler pulley and frictionally contacting with the spindle pulley to drive the same and manually releasable spring controlled means supporting the idler pulley capable of tensioning the belt or loosening it and causing the idler pulley to frictionally engage the spindle pulley.

7. In a grinding machine having a longitudinally movable head stock, a spindle, a driving pulley thereon, a power driven drum mounted in the machine base axially parallel with said pulley, an adjustably positioned idler pulley located above said spindle pulley, a single belt passing from the drum to the idler pulley and in contact with the sides of the spindle pulley, idlers to hold the two runs of the belt close together beneath the spindle pulley, means for swivelling said head stock on its support, means for driving the drum at variable speeds, automatic means for adjustably positioning the idler pulley to tension the belt and cause frictional driving engagement with the spindle pulley and manually controlled means for releasing said tension and dropping the belt from driving contact with the drum.

8. In a grinding machine, a head stock housing having an open top, a spindle mounted in the housing, a pulley therein, a movable cover for said open top, an idler pulley mounted in the cover, a power driven drum in the machine base, a belt connecting said drum and idler pulley and frictionally engaging the spindle pulley, idlers to hold the belt in contact with the spindle pulley and manually controllable resilient means to lift the cover and tension the belt.

9. A headstock spindle driving mechanism comprising a pulley on the spindle, a driver connected with a source of power, an idler pulley movable into and out of contact with the spindle pulley, a belt connecting the driver and the spindle and idler pulleys and means for moving the idler pulley to tension the belt and cause a driving action or for loosening the belt and bringing the two pulleys into contact and applying a braking action to the spindle pulley.

10. A headstock spindle driving mechanism comprising a pulley on the spindle, a driver connected with a source of power, a belt connecting the driver and the pulley, an idler pulley engaging the belt and movable to loosen the belt and stop the driving action and manually controllable means whereby friction may be positively applied to stop the rotation of the spindle.

11. A headstock spindle driving mechanism comprising a pulley on the spindle, a driving pulley connected with a source of power, a belt connecting said pulleys, an adjustably positioned idler pulley in contact with the belt, means for automatically moving the idler pulley to tension the belt and cause a driving action and manually controlled means constructed and arranged to move the idler pulley to release the driving tension of the belt and for applying a braking action to stop the rotation of the spindle.

Signed at Worcester, Massachusetts, this 16th day of Nov. 1922.

CHARLES H. NORTON.